May 10, 1949.  R. R. CURTIS  2,469,917
METHOD OF SEPARATING GASES FROM LIQUID FUEL
Filed Aug. 11, 1941  3 Sheets-Sheet 1
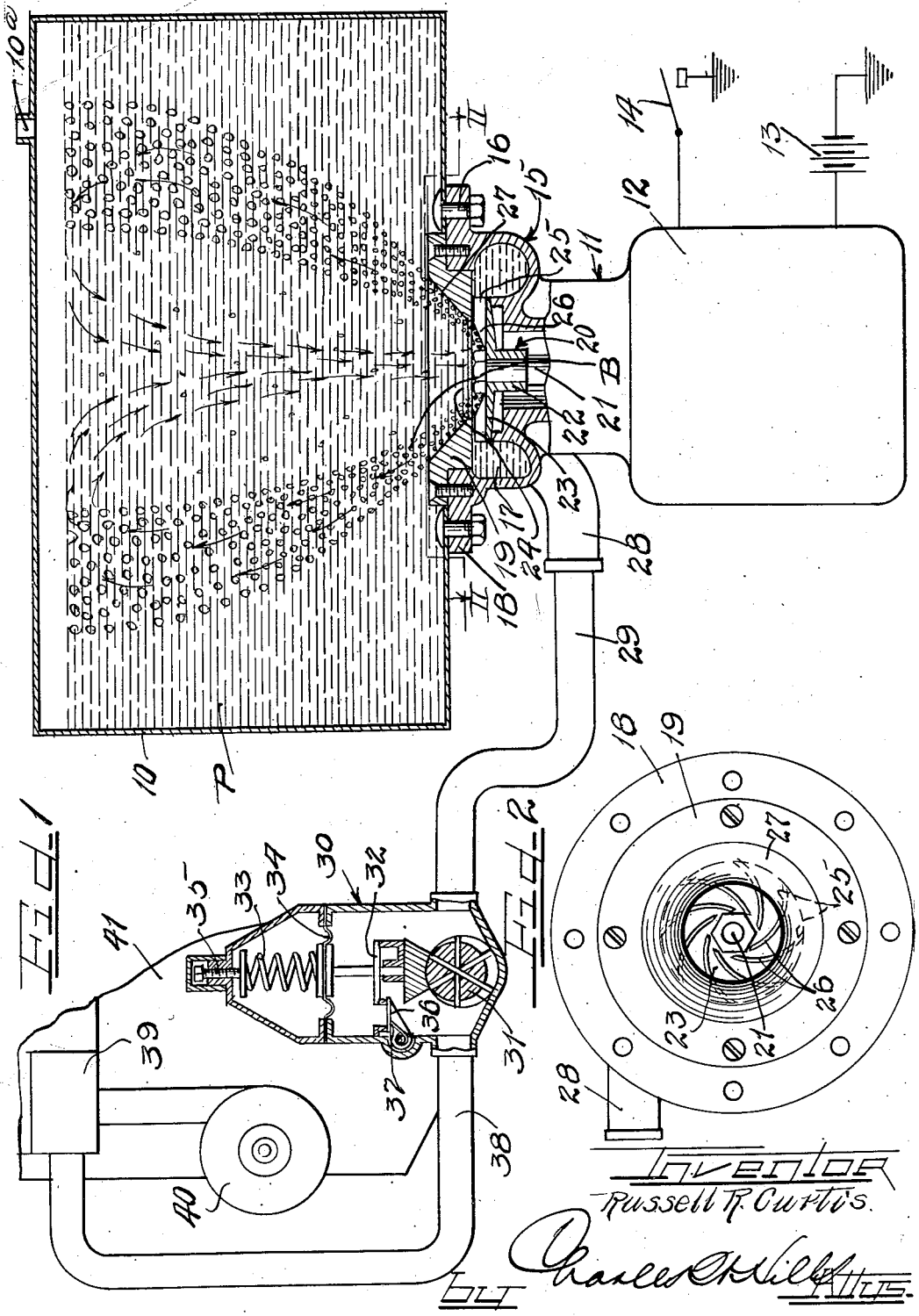

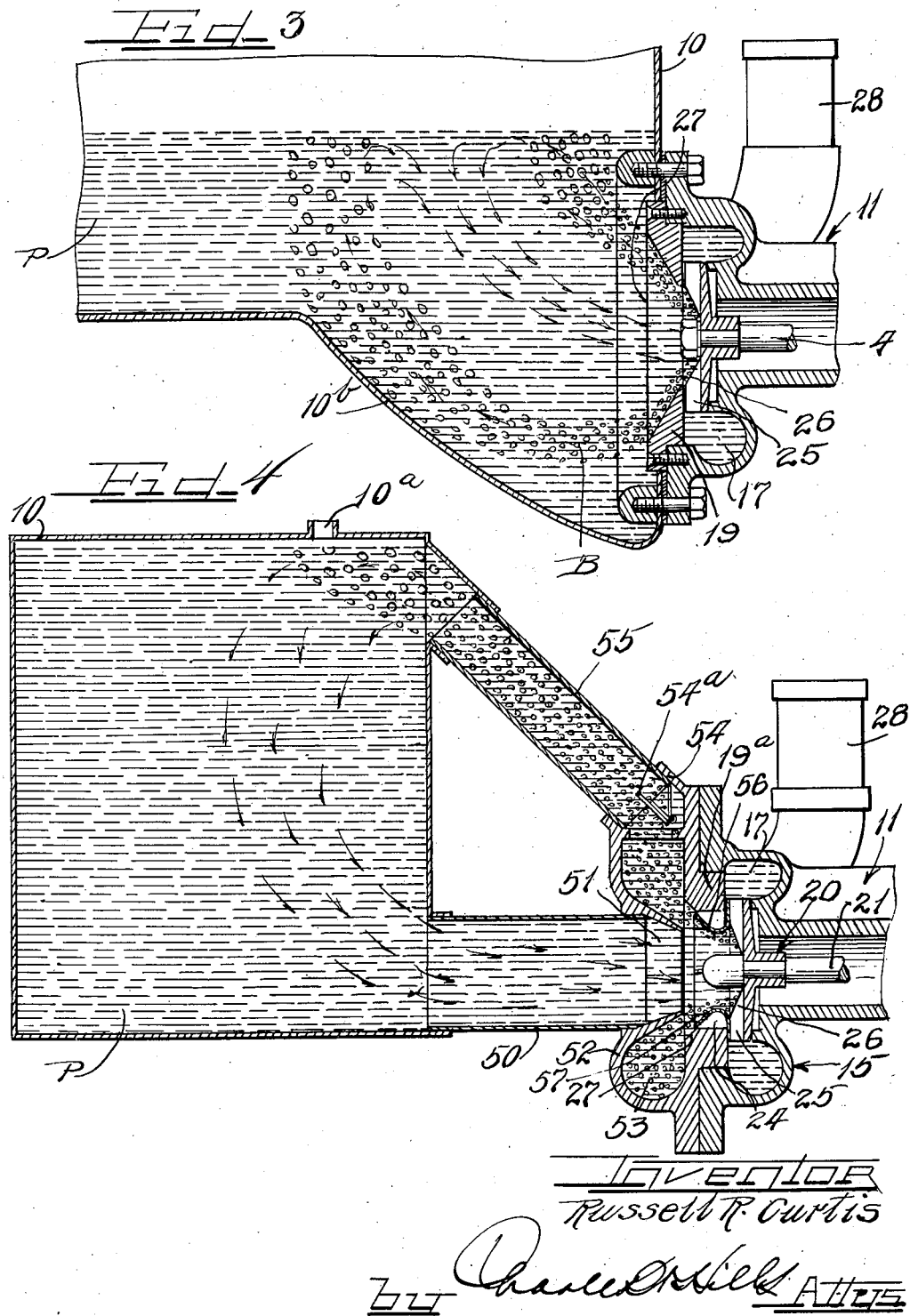

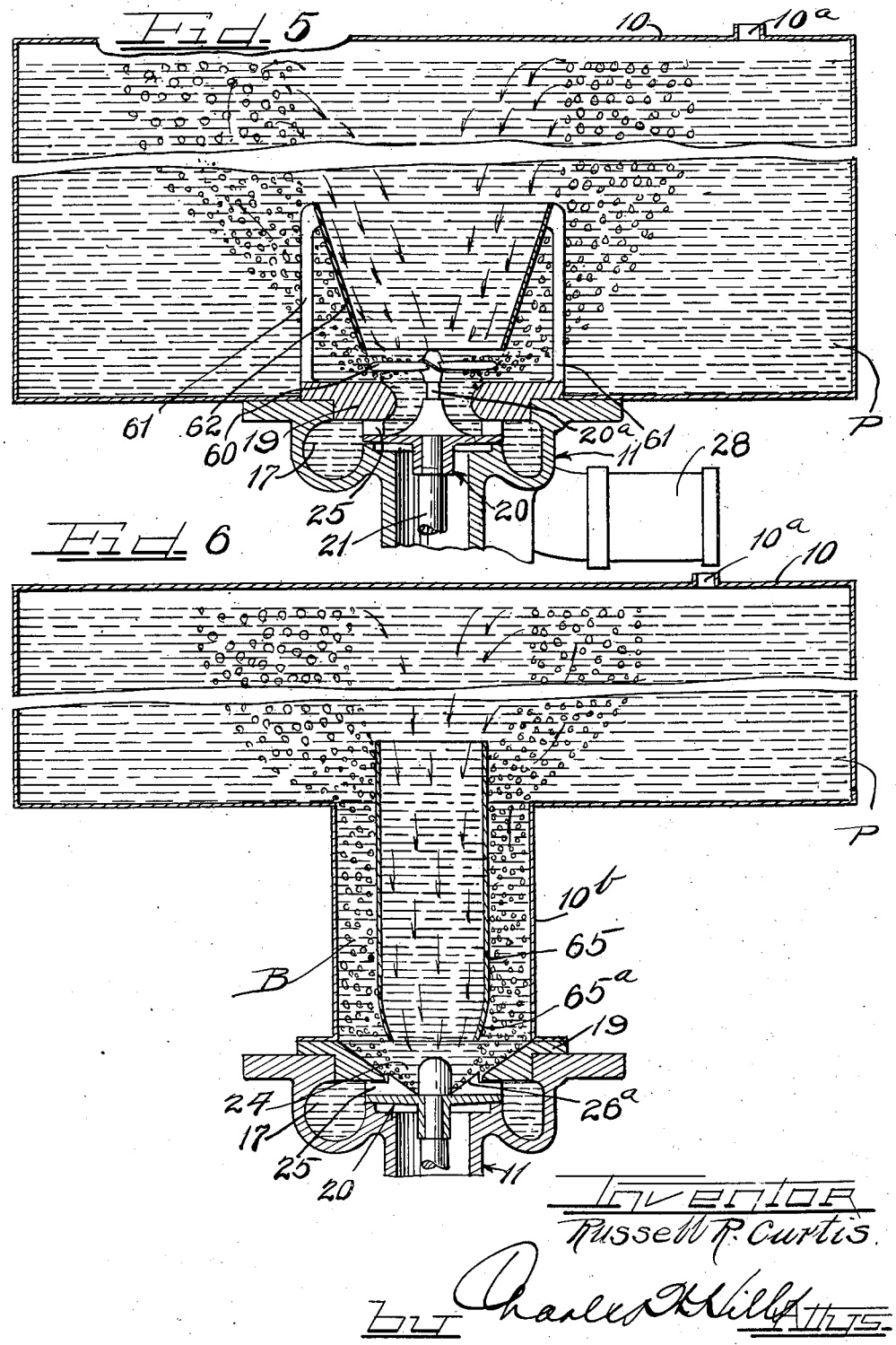

Patented May 10, 1949

2,469,917

UNITED STATES PATENT OFFICE 2,469,917

METHOD OF SEPARATING GASES FROM LIQUID FUEL

Russell R. Curtis, Dayton, Ohio, assignor to Curtis Pump Company, Dayton, Ohio, a corporation of Ohio Application August 11, 1941, Serial No. 406,277

3 Claims. (Cl. 183—2.5)

This invention relates to a method of separating gases and vapors from liquids and for inducing the formation of gases or liquids from volatiles about to be liberated from the liquid so that only fully liquid material is delivered from a source.

More specifically this invention relates to a method of preventing vapor lock in fuel systems and especially in aircraft fuel systems by beating bubbles of gas and vapor out of liquid fuel while simultaneously pressuring the liquid fuel to prevent additional liberation of gases or vapors therefrom.

This application is a continuation-in-part of my copending application entitled "Booster pump for aircraft fuel systems," Serial No. 352,064, filed August 10, 1940, now Patent No. 2,292,993, issued August 11, 1942.

While the invention will be specifically described in connection with aircraft fuel systems it should be understood that the invention is not limited to such use, but is broadly applicable to any system wherein it is desired to deliver only fully liquid material from a source containing the liquid admixed with gases and vapors, or having highly volatile ingredients therein about to be liberated from the liquid in the gaseous or vapor phase. The invention is particularly applicable for use in fuel systems to prevent vapor lock therein.

I have discovered that, contrary to the expected incorporation of air into a pond of fuel by agitating the pond, it is possible to actually beat out air, other gases and vapors from a pond of fuel by agitating the fuel below the top of the pond.

According to this invention, therefore, gases and vapors dispersed throughout liquid in a pond are beaten out of the liquid by forming the same into bubbles which rise through the pond and burst into the atmosphere at the top of the pond. The beating of the liquid not only creates bubbles from the occluded gases and vapors in the liquid but also induces the liberation of such gases and vapors still held in dissolved form in the liquid. In other words, volatiles dissolved in the liquid which are about to separate from the liquid as gases or vapors are caused to separate in the form of newly created bubbles produced by the beating action. As a result the liquid is not only freed from occluded gases and vapors but is stablized against the generation of additional occluded gases and vapors.

A feature of the invention includes the pressuring of the bubble-free liquid above the vapor pressure of the liquid immediately after separation of the gases and vapors therefrom so that the tendency of the liquid to vaporize is decreased to such an extent that spontaneous separation of additional gas or vapor does not occur.

In the operation of aircraft with gasoline or other volatile liquid as a fuel, it is well known that, as the atmospheric pressure drops with increase in altitude, a point is finally reached where the air and fixed gases in solution start to evolve, and the lighter constituents in the fuel to vaporize, until the engine fuel pump is no longer capable of delivering fuel in a fully liquid form to the engine. This condition frequently gives rise to what is known in the art as "vapor lock." The agitation of the fuel by the engine pump serves to aggravate the difficulties that may be experienced, by accelerating the separation of air or other fixed gases or vapors from the liquid fuel. In accordance with the present invention, however, these gases and vapors are liberated from the fuel before they reach the engine fuel pump, and the gas and vapor-freed fuel is maintained under pressure as it is fed to the engine fuel pump, so that the vapor lock condition cannot occur. The engine fuel pump thus not only receives a more stable liquid fuel, but receives this fuel under pressure.

As a result of the process of beating out gases and vapors as well as inducing the vaporization of dissolved volatiles about to vaporize, thereby producing a more stable fuel, and as a further result of insuring the stability of this fuel in the feed line to the aircraft fuel pump by pressuring the stabilized fuel, it is possible to fly the aircraft at higher altitudes than were heretofore possible, wtihout danger of engine failure.

It is then an object of this invention to provide a method of liberating gases and vapors from liquid.

A further object of this invention is to provide a method of preventing vapor lock in engine fuel systems and especially in aircraft fuel systems.

Another object of the invention is to beat out bubbles of gas and vapor from liquid fuel so that only fully liquid fuel will be delivered to a fuel line.

A specific object of this invention is to enhance the altitude range of aircraft by beating out gases and vapors from fuel before it is delivered to the aircraft engine.

A further specific object of this invention is to provide a method for stabilizing fuel by beating out gases and vapors therefrom while simultaneously pressuring the gas and vapor freed fuel to a greater value than the vapor pressure of the fuel for preventing further evolution of bubbles therefrom.

Other and further objects of the invention will become apparent to those skilled in the art from the following detailed descriptions of the annexed sheets of drawings which illustrate apparatus of various forms capable of being operated to perform the method of this invention. It is to be understood, however, that other types of apparatus may also be provided for carrying out the method and that the process is not limited for use with any of the particular illustrated forms of apparatus.

On the drawings:

Figure 1 is a schematic view illustrating a fuel system capable of being operated to perform the process of this invention.

Figure 2 is a plan view of the booster pump in the system of Figure 1, taken along the line II—II of Figure 1.

Figure 3 is a fragmentary cross sectional view, with parts in elevation, of the lower portion of a gasoline tank and the impeller portion of a booster pump, illustrating another manner in which the method of the invention may be carried out.

Figure 4 is a vertical cross sectional view, with parts in elevation, of a gasoline tank and the impeller end of a booster pump, illustrating still another form of apparatus for carrying out the process of this invention.

Figure 5 is a broken vertical cross sectional view, with parts in elevation, of a gasoline tank and booster pump assembly, illustrating still another form of apparatus for carrying out the invention.

Figure 6 is a broken fragmentary vertical cross sectional view of a gasoline tank and booster pump assembly illustrating another form of apparatus for carrying out the method of the invention.

As shown on the drawings:

In Figure 1 the reference numeral 10 designates the usual gasoline tank, vented as at 10a, for holding a pond P of gasoline or other volatile engine fuel. A booster pump assembly 11, composed of an electric motor 12 driven from a battery or other source of electric current 13 and controlled by a switch 14, and a pump assembly 15, is bolted by means of bolts 16 to the bottom of the tank 10. The pump assembly 15 is composed of a casing defining a pump volute chamber 17, an outturned annular flange 18 receiving the bolts 16 therethrough, a throat ring 19 and an impeller 20 driven by a shaft 21 from the electric motor 12. The impeller 20 is composed of a hub portion 22 keyed on the shaft 21 and a disk portion 23 spanning the inlet opening 24 defined by the throat ring 19. The disk 23 communicates around the periphery thereof with the volute chamber 17 and has upstanding curved pumping vanes 25 underlying the throat ring. The pumping vanes 25 have tapered inner end portions 26 disposed within the inlet opening 24 which, as explained hereinafter, serve as agitators or beaters for separating bubbles of gas and vapor from the fuel in the pond P.

The throat ring 19 flares outwardly from the inlet opening 24 to provide an enlarged mouth 27 in direct communication with the bottom of the pond P.

The volute chamber 17 discharges into an outlet 28 which is connected through a pipe line or tube 29 to the inlet of the engine fuel pump 30.

The fuel pump 30 includes an offset rotor 31 of the sliding vane type, a one-way relief valve 32 biased by a spring 33 to its closed position and forced to its open position by excessive back pressure on the discharge side of the pump. A balancing diaphragm 34 (more fully shown and described in my Patent 2,268,807) separates the pump casing into upper and lower chambers as shown, with the upper chamber vented to the atmosphere or to a supercharger. The diaphragm 34 compensates for negative loading of the relief valve 32 due to reduction in pressure on the intake side of the pump. If the diaphragm 34 were not used, the valve 32 would fluctuate on changes in intake pressures, even though the discharge pressure remained constant, due to suction forces on the top side of the valve. The balancing diaphragm negatives these suction forces. The spring pressure can be adjusted by means of an adjusting screw 35. The relief valve assembly allows excess fuel at the discharge side of the pump to return past the valve 32 to the inlet side of the pump.

A one-way by-pass valve 36 is provided to allow fuel to pass from the suction to the discharge side of the pump. The by-pass valve 36 can be held in closed position by a light spring 37.

The discharge side of the pump is connected through a pipe line or tube 38 to a fuel and air mixing device such as the carburetor 39 receiving air from a supercharger 40, and supplying the gasoline and air mixture to an engine 41.

When the booster pump 11 is at rest gasoline from the pond P can freely flow through the pump inlet 24, along the open ended channels defined by the flange 23 and the vanes 25 into the volute chamber 17, where it can be withdrawn through the outlet 28 and pipe line 29 into the inlet side of the pump 30 by the operating rotor 31 of the pump. The rotor 31 of the pump 30 is preferably driven by the engine 41, although it can be driven by any desired mechanism. Thus, even though the booster pump 11 is at rest, the fuel pump 31 can always receive fuel from the pond P. In the event that the discharge pressure of the fuel pump in the pipe line 38 is greater than that desired, the excess pumped gasoline will force open the valve 32 to vent the pressured gasoline to the suction side of the pump.

In the event that the fuel pump 31 becomes inoperative the booster pump 11 can pressure the fuel to the inlet of the pump and the pressured fuel can then force open the by-pass valve 36 to feed fuel to the carburetor 39. Thus fuel can be supplied to the engine 41 in the event that the booster pump is inoperative or in the event that the fuel pump becomes inoperative.

In accordance with this invention the booster pump 11 is operated so as to beat out gases and vapors from the liquid fuel being fed to the fuel pump. The vane portions 26 of the impeller 20 agitate the fuel in the inlet 24 of the pump and actually beat out bubbles B of gas and vapor from the liquid fuel. These bubbles B are thrown outwardly by the vanes and being lighter than the liquid fuel rise through the pond P along the outwardly flared mouth 27 of the throat ring to the top of the pond, where they burst at the surface and liberate the entrapped gases and vapors to the atmosphere through the vent 10a.

As shown in the drawing, the bubble path widens out and the bubbles become larger as they approach the surface of the pond P.

The impeller vanes create a funnel-shaped whirlpool in the pond P the particles of which rotate in the same direction as the impeller and move in a corkscrew fashion toward it, as indicated by the arrows in Figure 1. This whirlpool extends well upward into the tank and is present as soon as the booster pump is put in operation. As a result, the fuel freed from air and gases circulates as indicated by the arrows down through the whirlpool as a substantially solid or fully liquid feed to the impeller. A countercurrent circulation of fuel and bubbles is thus created in the tank, with the bubbles rising through the fuel outwardly from the whirlpool and with the fully liquid fuel being fed down through the funnel-shaped whirlpool to the impeller.

The fully liquid fuel is then thrown by centrifugal force between the vanes 25 on the impeller and the throat member, where the last remaining bubbles are forced from the fuel outwardly along the bubble path shown in Figure 1.

Fully liquid fuel is thereby pressured into the volute chamber 17 and is maintained under pressure through the pipe line 29 to be supplied to the fuel pump 31 under pressure.

The agitating vane portions 26 not only beat the occluded gases and vapors in the fuel into bubble form, but also generate additional bubbles from dissolved gases or vapors about to be liberated from the liquid. In other words, the agitating action of these vanes on the fuel induces bubble formation and stabilizes the liquid through separation therefrom of volatiles about to become vapors or gases.

When aircraft is flown to an altitude where the fuel in the pond P starts breaking up because of the reduced pressure, scattered bubbles may appear throughout the tank, but as explained above such bubbles are separated from the liquid fuel so that only fully liquid material is pressured into the fuel line 29.

In flying aircraft to high altitudes the booster pump 11 can be started before the fuel starts breaking up in the pond, so that the fuel will become stabilized even at the sub-atmospheric pressure. As a result, the aircraft can be flown to much higher altitudes, and even though the fuel breaks up at these high altitudes the booster pump will insure delivery of only fully liquid fuel from the pond to the fuel pump.

By immediately pressuring the bubble-free fuel in the volute chamber and by holding this pressure above the vapor pressure of the fuel throughout the entire flow of the liquid to the engine carburetor, additional gases or vapors can not be liberated.

While it is preferred to mount the booster pump 11 on the very bottom of the tank 10, in some installations it may be necessary to mount the pump 11 on the side wall of a tank 10 as shown in Figure 3. In this type of installation it is preferred that the tank have a sump portion 10b so that the tank can be substantially drained before the inlet mouth 27 of the pump is above the liquid level of the pond P.

In this side mounting the vane portions 26 agitate the fuel in the inlet to the pump and beat out the bubbles B to cause the same to flow along the sloping surface of the throat ring 19 as shown in the drawings. The impeller vanes create a whirlpool action in the pond P with the bubbles rising along the outer part of the whirlpool and with solid fuel being fed down through the vortex of the whirlpool to the inlet of the pump. In the lower portion of the pump the bubbles are thus initially thrown downwardly toward the sump 10b, and then rise through a widening bubble path to the surface of the pond P outwardly of the vortex. The bubbles thrown from the top portion of the pump rise along a gradually widening part, as indicated. The vane portions 25 underlying the throat ring 19 pump the bubble-free liquid to the volute chamber for discharge under pressure through the outlet 28 into the fuel line of the system such as is described above.

As long as the impeller is below the top of the pond P or below liquid level of the pond P, the fuel pressured into the volute chamber 17 will be free from entrained gases and vapors.

In the embodiment shown in Figure 4 the tank 10 has a laterally extending discharge conduit 50 at the bottom thereof entering the inlet 51 of a casing 52 mounted on the pump casing 15 of a booster pump 11. The casing 52 defines a peripheral volute chamber 53 around the inlet 51 which communicates around its inner periphery with the inlet to the pump casing 15 and which has a discharge outlet 54 on its outer periphery receiving a pipe or tube extending upwardly to the top of the tank 10. A spring-biased check valve 54a can be provided in the discharge outlet 54 to prevent back flow through the pipe 55 into the volute chamber 53. The throat ring 19a of the booster pump 11 can be integral with a wall of the casing 52.

The vanes 25 on the impeller 20 of the booster pump have a shroud ring 56 mounted thereon extending through the inlet of the pump and sloping outwardly into alignment with the flared surface 27 of the throat ring. A passageway is thus formed between the inlet 51 of the casing and the open-ended channels defined between the impeller vanes. The shroud ring 56 rotates with the impeller and preferably has small vanes 57 extending inwardly from the inlet mouth thereof, serving to act as a centrifugal pump of low capacity.

In this construction, therefore, the throat of the booster pump is provided with a vaned rotating member communicating at one end with the inlet of a casing and with the inner periphery of a volute chamber defined by this casing and communicating at the other end with the pumping channels defined between the vanes on the impeller of the booster pump.

Fuel from the pond P flows through the conduit 50 where it is acted upon by the vanes 57 of the shroud ring 56. These vanes agitate the fuel and discharge bubbles into the volute chamber 53 of the casing 52. As the fuel flows further into the booster pump it is again acted upon by the agitating vanes 26 of the pump which beat out additional remaining gases and vapors into bubbles for flowing with the bubbles beaten out by the vanes 57 into the volute chamber 53.

The pumping action of the vanes 57 serves to pump the bubble-rich fuel through the volute chamber 53 into the line 57 whenever the pressure is sufficiently great to open the check valve 54a. As a result, the bubble-rich fuel mixture will flow to the top of the tank and the bubbles will be liberated from the liquid by bursting into the atmosphere at the top of the pond.

The bubble-free liquid then flows downwardly as shown in the drawings by the arrows, back to the line 50, where it is again acted upon by the vanes of the pump assembly.

In this embodiment, therefore, the booster pump may be remote from the gasoline tank and the gasoline is conducted along a predetermined path to the pump where it is beaten at a juncture of this path with another path communicating with the tank. The liquid fuel is contemporaneously impelled along the first path, while the separated bubbles are delivered back through the other path to the tank.

In the embodiment shown in Figure 5 the booster pump 11 is mounted on the bottom of the tank 10 similarly to the mounting of Figure 1. In Figure 5, however, the impeller 20 of the pump 11 only has the vane portions 25 around the outer periphery thereof underlying the throat ring 19. The impeller 20 carries a shaft portion 20a extending through the inlet of throat ring 19 into the pond P above the throat ring.

A multi-vaned propeller 60 is mounted on the upper end of the shaft 20a and is thus disposed within the tank 10. The throat ring 19 preferably carries, on legs 61, a hollow frusto-conical shield 62. The conical shield 62 has the lower and smaller end thereof disposed in spaced relation just above the propeller 60, while the larger upper end thereof is disposed at a higher level in the pond P.

When the impeller 20 is rotated the propeller 60 will be driven, to beat out bubbles of gas and vapors from the fuel acted upon by the blades thereof. The propeller will discharge bubbles of vapors and gases outwardly of the shield member 62, so that the same can rise along an outwardly flaring path, as shown on Figure 5, on the outside of the shield.

The bubbles will thus rise to the surface of the pond P, while the bubble-free liquid will flow downwardly through the shield 62 to the propeller 60.

The propeller thus serves to beat out bubbles from the liquid flowing down through the vortex of the whirlpool created by the impeller before this liquid reaches the pumping vanes 25 of the impeller. However, the inner ends of these pumping vanes 25 may also serve to further agitate the fuel previously acted upon by the propeller 60 so as to liberate and create additional bubbles in the fuel. These additionally liberated bubbles can rise through the throat ring 19, as indicated, and flow upwardly and outwardly with the previously liberated bubbles, on the outside of the shield 62.

In the embodiment shown in Figure 6 the tank 10 has a sump portion or enlarged duct portion 10b depending from the bottom thereof and the booster pump 11 is attached to the bottom of this portion 10b as indicated.

A tube or other duct 65 is mounted in the portion 10b and extends into the tank 10 above the bottom thereof. The lower end of the duct 65 terminates at the inlet mouth of the throat ring 19 of the booster pump inwardly from the outer periphery thereof and is preferably turned in as at 65a to form a discharge mouth of substantially the same diameter as the inlet 24 of the pump.

The impeller 20 of the pump has the usual pumping vanes 25 thereon and has agitating vane portions 26a forming continuations of the pumping vanes 25 within the inlet 24. These vane portions 26a extend upwardly into the inlet 24, as shown.

Fuel from the pond P fills the duct 65 and the sump 10b. When the impeller 20 is rotated the whirlpool action created in the sump draws the liquid fuel down through the duct 65 into the intake inlet 24 of the pump. The agitating vanes 26a act on the liquid fuel to beat out the bubbles B therefrom and flow these bubbles outwardly along the sloping surface of the throat ring, as shown. The bubbles then rise through the sump 10b around the duct 65 and enter the bottom of the tank 10, where they spread outwardly as shown and rise to the surface of the pond P to burst into the atmosphere. The liquid, freed from the bubbles, then flows down in the direction indicated by the arrows through the duct 65 to the pump. As a result, only fully liquid fuel is pumped by the vanes 25 into the volute chamber 17 and this fully liquid fuel is held under pressure, as described above.

From the above description it will be understood that the method of this invention can be carried out with many different forms of apparatus and that the method deals with the beating out of gases and vapors, in bubble form, from liquid at any point below the surface of the liquid. The beating out action occurs by centrifugal agitation of the liquid below the surface of the liquid and can be immediately under a pond of the liquid or at a point spaced from the pond.

I claim as my invention:

1. The method of eliminating vapor lock in an airplane fuel system and stabilizing volatile liquid fuel for high altitude performance which comprises providing a pond of volatile liquid fuel, flowing fuel under hydraulic head pressure from the pond, agitating the flowing fuel about to leave the pond while it is still in lateral communication with the pond to create a laterally outward flowing stream of bubble-rich liquid, diverting said stream away from the flowing fuel to the surface of the pond where the bubbles may burst to discharge their gases and vapors, recirculating the bubble-liberated fuel back to the flowing fuel, and pressuring said flowing fuel immediately after it has been agitated to a pressure sufficient to stop spontaneous separation of additional gas or vapor therefrom, whereby volatiles in the fuel which successfully become unstable at increasing altitudes are successively eliminated from the pond to provide a stable fuel for pressuring in fully liquid form.

2. The method of eliminating vapor lock and stabilizing volatile fuel for high altitude performance under ambient air pressures below normal atmospheric pressure which comprises providing a pond of volatile liquid fuel, locally agitating fuel at a level below the surface of the pond while the fuel is still in lateral communication with the pond, creating in said pond counterflowing, concentric streams of liquid fuel and bubble-rich fuel with the bubble-rich fuel stream rising in the pond outwardly of and around the liquid fuel stream, allowing bubbles in the bubble-rich stream to burst at the surface of the pond, and recirculating bubble-liberated fuel from the bubble-rich stream back to the counterflowing liquid fuel stream.

3. The method of treating airplane fuel to prevent vapor lock in airplane fuel systems while retaining highly volatile fuel ingredients in liquid form which comprises providing a pond of liquid airplane fuel, flowing fuel out of the bottom of said pond, agitating the flowing fuel while it is still in lateral communication with said pond at a point adjacent the bottom of the pond, creating a laterally outward flowing stream of bubble-rich liquid, directing the bubble-rich liquid stream away from the flowing fuel to the surface of the pond where the bubbles may burst to discharge their gases and vapors, recirculating bubble-liberated fuel from said bubble-rich stream to join the flowing fuel, and pressuring the flowing fuel immediately after it has been agitated to deliver fully liquid fuel from the pond whereby the fuel is agitated only at the bottom of the pond where the volatiles are under hydraulic head pressure and only those volatiles about to gasify at this pressure are formed into bubbles.

RUSSELL R. CURTIS.

REFERENCES CITED

The following references are of record in the file of this patent:

UNITED STATES PATENTS

| Number | Name | Date |
|---|---|---|
| 828,887 | Hoofnagle | Aug. 21, 1906 |
| 1,667,139 | Borden | Apr. 24, 1928 |
| 1,799,590 | Kiefer | Apr. 7, 1931 |
| 1,871,055 | Hasbrouck | Aug. 9, 1932 |
| 2,189,658 | Sibley | Feb. 6, 1940 |
| 2,216,542 | Paige | Oct. 1, 1940 |
| 2,238,502 | Muir et al. | Apr. 15, 1941 |
| 2,262,617 | L'Orange | Nov. 11, 1941 |
| 2,292,993 | Curtis | Aug. 11, 1942 |

FOREIGN PATENTS

| Number | Country | Date |
|---|---|---|
| 209,439 | Great Britain | Jan. 7, 1924 |
| 541,252 | France | Apr. 29, 1922 |
| 16,500 | Denmark | Sept. 26, 1912 |